United States Patent
Yamamoto

(10) Patent No.: US 8,456,710 B2
(45) Date of Patent: Jun. 4, 2013

(54) APPLYING DENSITY ADJUSTMENT IN PROCESSING BARCODE IMAGE DATA

(75) Inventor: Yuko Yamamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 869 days.

(21) Appl. No.: 12/271,591

(22) Filed: Nov. 14, 2008

(65) Prior Publication Data

US 2009/0128838 A1    May 21, 2009

(30) Foreign Application Priority Data

Nov. 16, 2007   (JP) .................................. 2007-297627

(51) Int. Cl.
*G06T 5/00* (2006.01)
*H04N 1/60* (2006.01)

(52) U.S. Cl.
USPC .......................................... 358/3.26; 358/1.9

(58) Field of Classification Search
None
See application file for complete search history.

(56) References Cited

U.S. PATENT DOCUMENTS

| | | | | |
|---|---|---|---|---|
| 5,751,434 | A * | 5/1998 | Narendranath et al. | 358/1.9 |
| 5,881,210 | A * | 3/1999 | Guay et al. | 358/1.9 |
| 6,154,227 | A * | 11/2000 | Lund | 347/14 |
| 6,172,688 | B1 * | 1/2001 | Iwasaki et al. | 347/2 |
| 6,290,318 | B1 * | 9/2001 | Yasukawa | 347/16 |
| 6,975,414 | B2 | 12/2005 | Nagatomi et al. | |
| 7,298,522 | B2 | 11/2007 | Sugimoto | |
| 7,679,781 | B2 * | 3/2010 | Shibuya et al. | 358/1.9 |
| 2003/0048460 | A1 * | 3/2003 | Vinals-Matas et al. | 358/1.8 |
| 2005/0046882 | A1 * | 3/2005 | Kobayashi | 358/1.9 |
| 2009/0086228 | A1 * | 4/2009 | Yoshida | 358/1.9 |
| 2009/0116048 | A1 * | 5/2009 | Usami | 358/1.9 |

FOREIGN PATENT DOCUMENTS

| | | |
|---|---|---|
| JP | 08-251363 | 9/1996 |
| JP | 2001-353857 | 12/2001 |
| JP | 2002-072603 A | 3/2002 |
| JP | 2002-199236 | 7/2002 |
| JP | 2003-076097 A | 3/2003 |
| JP | 2004-274476 A | 9/2004 |
| JP | 2006-140661 | 6/2006 |

OTHER PUBLICATIONS

Tanaka, Akio, "Seven Techniques in Photoshop", Kazuo Kunitani, Japan, Nikkei Business Publications, Inc., Aug. 9, 2004, pp. 14-20.

* cited by examiner

*Primary Examiner* — Barbara Reinier

(57) ABSTRACT

An image processing device and image processing method maintain hue and prevent a drop in print quality while also reducing consumption of recording materials. For example, a host computer 3 that outputs output data for printing to an inkjet printer 2 that uses cyan (C), magenta (M), and yellow (Y) inks has a drawing unit 210 that acquires bitmap data expressing the density of each channel in each pixel of an image to be printed, a density adjustment parameter setting unit 250 that sets an adjustment value according to the ink deposition level when the ink deposition level setting ink usage is received, a density adjustment unit 220 that adjusts the density of the bitmap data to a density corresponding to the set adjustment value, a color conversion unit 230 that converts the density-adjusted bitmap data to CMY image data expressing the usage of each ink, and a halftone processing unit 240 that generates the output data based on the CMY image data.

6 Claims, 10 Drawing Sheets

| PAPER TYPE | INK DEPOSITION LEVEL | | |
|---|---|---|---|
| | -5% | -10% | -20% |
| PLAIN PAPER | 5 | 10 | 20 |
| BOND PAPER | 7 | 13 | 25 |
| SYNTHETIC PAPER | 11 | 20 | 40 |

| PAPER TYPE | DENSITY ADJUSTMENT LEVEL | | | | |
|---|---|---|---|---|---|
| | 1 | 2 | 3 | 4 | 5 |
| PLAIN PAPER | 20 | 15 | 10 | 5 | 0 |
| PLAIN PAPER LABEL | 30 | 22 | 15 | 7 | 0 |
| BOND PAPER | 40 | 30 | 20 | 10 | 0 |
| ⋮ | ⋮ | | | | |

KT

APPLYING DENSITY ADJUSTMENT IN PROCESSING BARCODE IMAGE DATA

CROSS-REFERENCE TO RELATED APPLICATIONS

Japanese Patent application No. 2007-297627 is hereby incorporated by reference in its entirety.

BACKGROUND

1. Field of Invention

The present invention relates to an image processing device, an image processing method, and an image processing program for printing by combining recording materials of a plurality of colors such as cyan, magenta, and yellow.

2. Description of Related Art

Color printers that print by overlaying different colors of ink or other recording materials such as cyan, magenta, and yellow are known from the literature. When an inkjet printer, for example, prints on a medium that absorbs fluid ink easily, such as plain paper, for example, different colors of ink blend together and form mixed colors even if the printed data is separated by a dot. When printing on a recording medium that is more resistant to ink absorption, such as synthetic paper, the ink may not be absorbed and may flow over the surface.

Japanese Unexamined Patent Appl. Pub. JP-A-2001-353857 is directed to an inkjet printer that reduces the overlapping portions of ink dots formed on the recording medium to a level that does not result in a drop in print quality. More specifically, first and second ink nozzle rows are offset one-half dot pitch from each other in line with the ink nozzle rows, and the diameter of the ink dots discharged from the ink nozzles and formed on the recording medium is less than the nozzle pitch.

Japanese Unexamined Patent Appl. Pub. JP-A-2002-199236 pertains to an inkjet printer that prints using a cyan (C), magenta (M), yellow (Y), black (K) ink set and can adjust the density of the barcode that is printed. This inkjet printer converts RGB color image data to CYMK image data corresponding to the same output colors using appropriate amounts of cyan (C), magenta (M), yellow (Y), and black (K) ink, and then adjusts the density of the CYMK image data to adjust the barcode density.

Japanese Unexamined Patent Appl. Pub. JP-A-H08-251363 is directed to a printer that produces black using a cyan (C), magenta (M), and yellow (Y) ink set. More specifically, a printer that has a cyan (C), magenta (M), and yellow (Y) ink set combines suitable amounts of cyan (C), magenta (M), and yellow (Y) ink dots printed at the same location to produce a composite black dot without using black (K) ink.

A problem with the printer taught in Japanese Unexamined Patent Appl. Pub. JP-A-2001-353857 is that bleeding between adjacent dots can be extreme depending upon the type of paper used, and the print quality therefore drops accordingly. The amounts of cyan (C), magenta (M), and yellow (Y) ink may be reduced uniformly to reduce such bleeding, but this method also changes the printed color and prevents achieving the desired output.

More particularly, it may not be possible to print and read the correct code from a barcode printed with composite black when bleeding is severe because a barcode is read based on the ratio between the width of the bars and spaces. In addition, if the density of the composite black is adjusted in the image data after color conversion as taught in Japanese Unexamined Patent Appl. Pub. JP-A-2002-199236, quantization error, for example, may occur in the color density adjustment process. As a result, the balance between the colors producing the composite black is disrupted and color shift may occur in the black areas.

This means that if a color density adjustment process is used when printing a barcode with composite black, the color of the barcode may deviate from the intended color and read errors may result when reading the barcode with a barcode reader. The color shift also means that the printed black will not look black and the appearance is poor. However, if the color density is not adjusted in order to prevent such a color shift, excessive ink density may cause the barcode to bleed, thus causing barcode read errors resulting from deviations in the bar width or from insufficient ink density. Repeatedly printing composite black also results in rapid consumption of cyan (C), magenta (M), and yellow (Y) ink.

It is therefore difficult for a printer that prints black by printing composite black to achieve the desired color and density, and it is particularly difficult to print a high quality barcode.

SUMMARY OF INVENTION

An image processing device and image processing method according to the present invention enable printing the desired color while preventing a drop in print quality and reducing consumption of recording materials. The invention also prevents a drop in the print quality of barcodes printed with composite black.

The present invention is directed to solving at least some of the foregoing problems as described below.

A first aspect of the invention is directed to an image processing device that outputs data to a printer for printing using a plurality of different primary recording materials, e.g., different chromatic colors. Such an image processing device includes an acquisition unit that acquires first image data representing the density of each color in each pixel of an image to be printed; a setting unit that receives a usage setting that sets usage of the primary recording materials and sets an adjustment value corresponding to the usage setting; an adjustment unit that adjusts the density of the first image data based on the adjustment value; a conversion unit that converts the density-adjusted first image data to second image data representing usage of each primary recording material; and a generating unit that generates the output data based on the second image data.

Before converting to the second image data, this aspect of the invention adjusts the density of the first image data. This eliminates the quantization error that occurs with the related art when the density adjustment process is applied after color conversion, and reduces disruption of the balance between the amounts of recording materials that are used. More specifically, because output data that retains the hue of the first image data before the density is adjusted can be generated, a drop in print quality can be prevented.

In addition, the adjustment value is set according to the usage setting that determines how much recording material is used. Therefore, when the user inputs a value that reduces the amount of recording material used as the usage setting, for example, a drop in print quality can be prevented while hue is maintained while also reducing recording material consumption.

In an image processing device according to a second aspect of the invention the adjustment unit adjusts the density of the first image data by applying a shifting function.

In this aspect of the invention the density of the first image data may be adjusted as follows. For example, if the set adjustment value is ΔV, the gradation value (R,G,B)=(0,0, 0)

of the origin before density adjustment is replaced by the gradation value (R,G,B)=(ΔV, ΔV, ΔV) after density adjustment. When the first image data is then converted based thereon to the second image data, recording material usage can be adjusted according to the adjustment value ΔV, and a drop in print quality can be prevented while also reducing recording material consumption. Because the amount of each color of recording material used to print barcodes from composite black produced by red, green, and blue inks, for example, can therefore be reduced, bleeding can be prevented in the printer output and a drop in print quality can be prevented.

An image processing device according to a third aspect of the invention also has a display unit that displays an input screen for inputting a primary recording material usage level as the usage setting, and an operating unit that receives such level input to the input screen. The setting unit sets the adjustment value corresponding to the usage level based on the input received by the operating unit.

In this aspect of the invention the adjustment value is set automatically according to the usage level set by the user entering data to an input screen displayed on the display unit. The user can therefore simply input the desired usage level and use an image processing device that is aware of the operating cost while maintaining the desired hue.

A fourth aspect of the invention is an image processing device that also has a display unit that displays an input screen for inputting a primary recording material density adjustment level as the usage setting, and an operating unit that receives such level input to the input screen. The setting unit sets the adjustment value based on the input received by the operating unit.

In this aspect of the invention the adjustment value is set automatically according to density information input by the user to an input screen displayed on the display unit. The user can therefore easily adjust the output data to the desired density while retaining hue.

In an image processing device according to a fifth aspect of the invention the input screen enables selecting one of a plurality of primary recording material usage or density adjustment levels corresponding to different degrees of density adjustment, and the setting unit sets the adjustment value based on the level selected.

This aspect of the invention enables the user to easily set the appropriate adjustment value corresponding to the desired degree of adjustment by simply selecting the desired level from among a plurality of levels displayed on screen.

By adjusting the density according to the input density adjustment value or degree of adjustment before converting to the second image data that produces each color using a combination of plural recording materials, the balance between the amounts of recording materials that are used to express each color in the second image data is not changed by adjusting the density. The output data generated based on the second image data therefore enables printing images and other content with the desired density and little color shifting in colors printed using a combination of plural recording materials.

More specifically, because the adjustment unit of the image processing device can adjust the density of the maximum density achromatic color, images and other content can be printed with desirable quality and with little color shift and the maximum density achromatic color printed with suitably adjusted density. As a result, high quality barcodes can be printed with little color shift while preventing bleeding and insufficient density.

Furthermore, because the adjustment unit of the image processing device described above can increase or decrease the density of other achromatic colors according to the increase or decrease in the density of the maximum density achromatic color resulting from density adjustment, the maximum density achromatic color and lower density achromatic colors can be printed with little color shift and appropriate density. In addition, because the density of the overall image changes, loss of gradation is also inhibited.

In an image processing device according to a sixth aspect of the invention, the input screen enables selecting the type of print medium on which to print from a plurality of print media types, and the setting unit sets the adjustment value according to the print medium selected.

This aspect of the invention sets the adjustment value according to the type of print medium selected from the input menu, and thus prints with density suitable to the selected print medium. As a result, the print density can be controlled according to differences in the characteristics of the type of print medium, such as susceptibility to bleeding.

In an image processing device according to a seventh aspect of the invention the first image data represents a barcode image.

This aspect of the invention enables printing high quality barcodes with little color shift while preventing bleeding and insufficient density.

An eighth aspect of the invention is an image processing method that generates output data for printing using a plurality of primary recording materials, including the steps of acquiring first image data representing the density of each color in each pixel of an image to be printed; setting an adjustment value corresponding to a usage setting that sets usage of each of the primary recording materials; adjusting the density of the first image data on the adjustment value; converting the density-adjusted first image data to second image data representing usage of each of the plurality of primary recording materials; and generating the output data based on the second image data.

A ninth aspect of the invention is a device-readable medium containing an image processing program that, when executed, causes a device to generate output data for printing using a plurality of primary recording materials, where the program comprises instructions for carrying out the method steps identified above.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
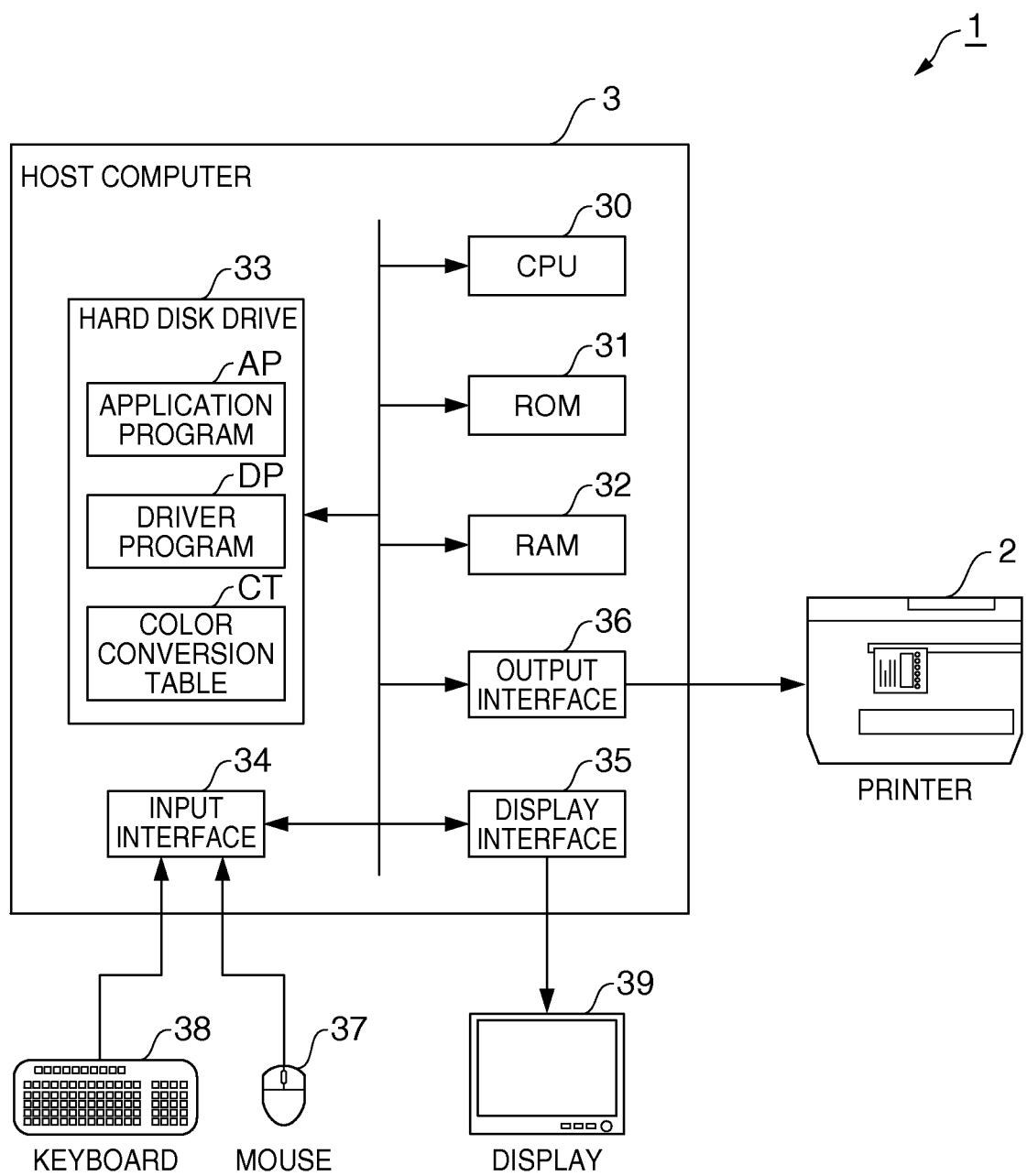
FIG. 1 is a block diagram showing the hardware configuration of a printing system according to a first embodiment of the invention.

Preferred embodiments of the present invention are described below with reference to the accompanying figures. Note that parts that are functionally the same as parts that have already been described are identified by the same reference numerals, and further description thereof is omitted.

Embodiment 1

FIG. 1 is a block diagram showing the hardware configuration of a printing system according to a first embodiment of the invention.

As shown in FIG. 1 this printing system 1 includes an inkjet printer (printing apparatus) 2 and a host computer 3 (image processing device) that controls the inkjet printer 2. The inkjet printer 2 has an ink cartridge that stores cyan (C) ink, an ink cartridge that stores magenta (M) ink, and an ink cartridge that stores yellow (Y) ink, and prints a composite black by combining the three colors of ink (printing agent) cyan (C), magenta (M), and yellow (Y). Each of the ink cartridges is removable.

The configuration of the host computer 3 is described next.

The host computer 3 is a general purpose personal computer having a CPU 30, ROM 31, RAM 32, a hard disk drive 33, an input interface 34, a display interface 35, and an output interface 36. The input interface 34 is the interface to which input devices (operating devices) such as a keyboard 38 and mouse 37 are connected, and receives operating signals corresponding to user actions from the input devices.

The display interface 35 is the interface to which a display 39 is connected, and controls what is displayed by outputting display data to the display 39.

The output interface 36 is the interface for communication with the inkjet printer 2, and is connected by a cable, for example, for data communication with the inkjet printer 2.

An application program AP, driver program DP (image processing program), and color conversion table CT are stored in the hard disk drive 33. The application program AP and driver program DP are typically stored on a recording medium for supply to the host computer 3, and are read from the recording medium by an appropriate reading device (not shown in the figure) connected to the host computer 3 for recording on the hard disk drive 33. Examples of usable recording media include floppy disks, CD-ROM, DVD-ROM, and other types of optical discs, magneto-optical discs, memory cards, removable hard disk drives, and other types of computer-readable storage media. Alternatively, the host computer 3 may download the programs from a server over a communication connection instead of from a storage medium such as described above for recording to the hard disk drive 33.

The color conversion table CT is used for the color conversion process described below, and tables optimized for different types of printing media, such as plain paper, plain paper labels, bond paper, and synthetic paper, are separately stored on the hard disk drive 33.

The software configuration of the host computer 3 is described next.

Figure 2:
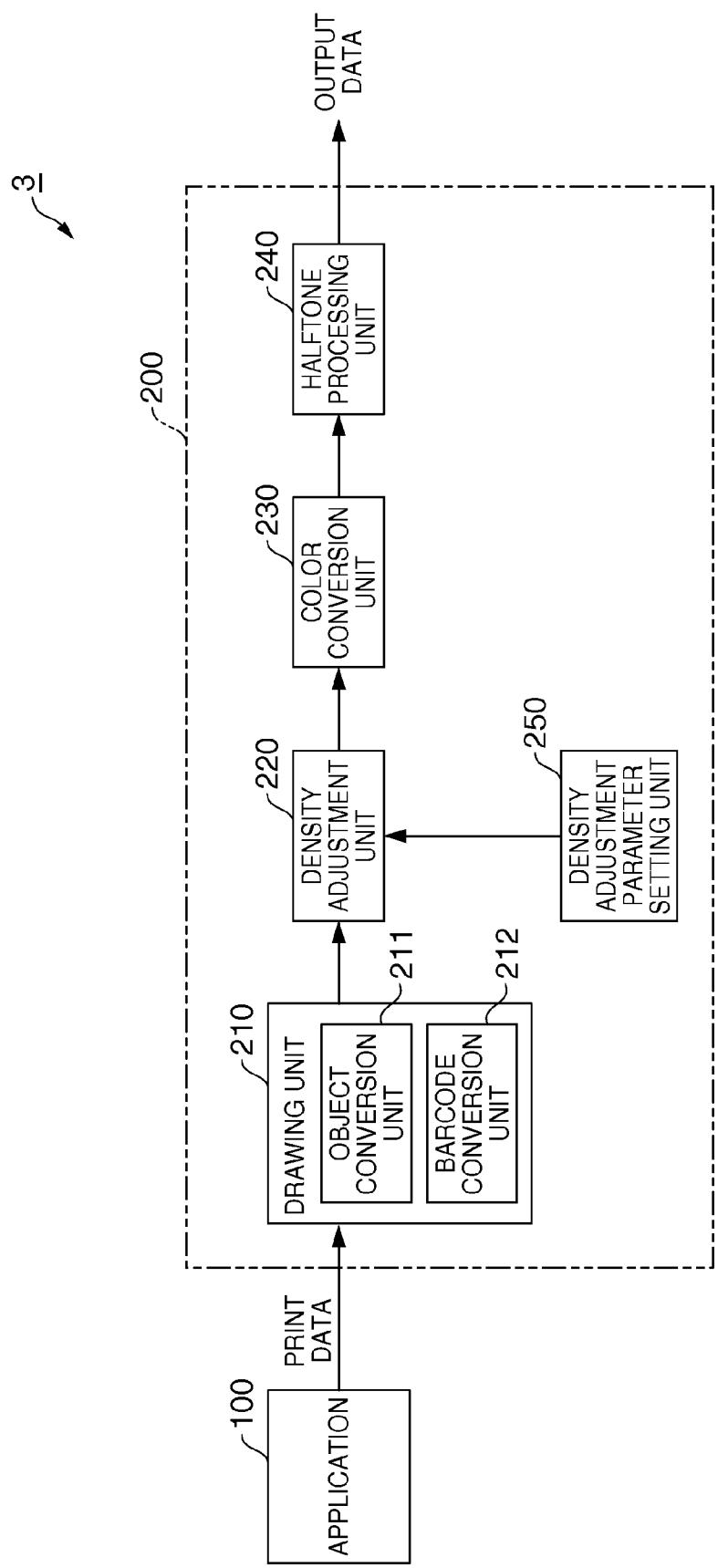
FIG. 2 is a block diagram showing the software configuration of the host computer.

FIG. 2 is a block diagram showing the software configuration of the host computer 3. As shown in FIG. 2 the host computer 3 has an application 100 and a printer driver 200.

The application 100 is a barcode generating program that functions by means of the application program AP, and generates print data in a predetermined language for text, graphics, images, and other objects input by the user using the mouse 37 or keyboard 38. In addition to human-readable character fonts, the application 100 can also select a desired barcode font from among a plurality of barcode fonts conforming to different barcode standards for printing for text objects containing numbers and letters.

More specifically, after the user operates the mouse 37 and keyboard 38 to input a text string and select a barcode font for the input text string, the application 100 generates print data for printing a barcode containing the input text string with the specified barcode font. The application 100 then passes the print data to the printer driver 200.

The printer driver 200 is a program that controls printing by the inkjet printer 2, and includes a drawing unit 210 (acquisition unit), density adjustment unit 220 (adjustment unit), color conversion unit 230 (conversion unit), halftone processing unit 240 (generating unit), and density adjustment parameter setting unit 250 (configuration unit). These functional units are rendered by the CPU 30 reading the driver program DP stored on the hard disk drive 33 and executing the driver program DP in conjunction with the ROM 31 and RAM 32.

Drawing Process

The drawing unit 210 includes an object conversion unit 211 and a barcode conversion unit 212. The object conversion unit 211 interprets the text, graphics, images, and other object descriptions for which a human-readable font is specified in the print data received from the application 100, and converts it to image data for the text, graphics, and images in RAM 32.

The barcode conversion unit 212 interprets the description of objects for which a barcode font is specified, generates a barcode corresponding to the text string according to the barcode standard of the selected barcode font, and writes image data for the resulting barcode to RAM 32.

Bitmap data (first image data) corresponding to the content described in the print data is generated in RAM 32 as a result of the object conversion unit 211 converting the image data of the text, graphics, and images and the barcode conversion unit 212 converting the bode image data. This bitmap data describes the gray level of each channel in each pixel of the image data, and in this embodiment of the invention is 256-level RGB image data in which the density of each color, red (R), green (G), and blue (B), has a gray level value from 0 to 255. In the RGB color system the output color is achromatic when red, green, and blue each have the same gray level; black, where (R,G,B)=(0,0, 0), is achromatic and has the highest color density; and white, where (R,G,B)=(255, 255, 255), is achromatic and has the lowest color density.

Density Adjustment Process

Figure 3:
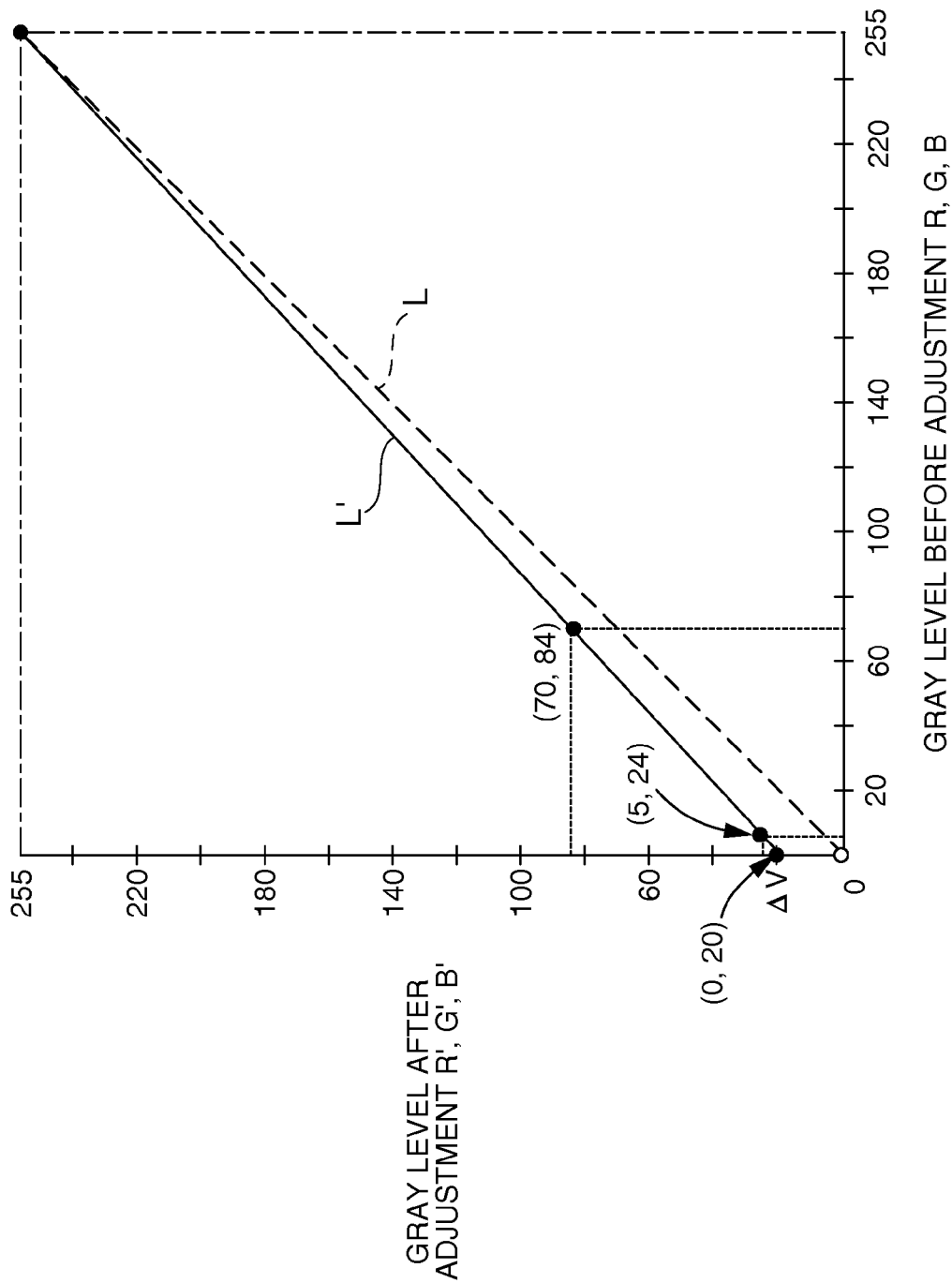
FIG. 3 is a graph showing the change in gradation before and after applying a density adjustment process.

The density adjustment unit 220 executes a density adjustment process to adjust the print density of each channel of each pixel. FIG. 3 is a graph showing the gradation levels before and after adjustment by the density adjustment process. The gradation level (R,G,B) before density adjustment of the (R,G,B) image data is shown on the horizontal axis (x-axis), and the gradation level (R', G', B') after density adjustment is shown on the vertical axis (y-axis).

As shown in FIG. 3, the density adjustment process applies adjustment value ΔV (≧0) to the gradation values of black (R,G,B)=(0,0,0) before adjustment, and outputs the converted levels (R',G',B')=(ΔV, ΔV, ΔV). The gray values of white (R,G,B)=(255,255,255) are not adjusted, and white is output as (R',G',B')=(255,255,255). A linear conversion is applied to gray levels with a lower density than black (0<R, G,B<255) so that there is a smooth, continuous transition in the adjusted gray levels from black to white after adjusting the gray levels from (R',G',B')=(ΔV, ΔV, ΔV) to (R',G',B')=(255, 255,255). By thus adjusting the gray levels of red (R), green (G), and blue (B) the same amount, the density adjustment process keeps achromatic colors in the (R,G,B) image data achromatic while adjusting the density of black and gray to generate the R'G'B' image data.

The process shown in FIG. 3 can be applied to each channel of red (R), green (G), and blue (B). Dotted line L is a function showing the gradation change before density adjustment. When the density is adjusted by the adjustment value ΔV, the function showing the gray level after adjustment is a predetermined function with an intercept at adjustment value ΔV as indicated by solid line L'. This predetermined function is described below.

Note that because the amount of ink that is used to print black (R',G',B')=(ΔV, ΔV, ΔV) after adjusting the density by ΔV (≧0) as shown in FIG. 3 is reduced, bleeding of ink while printing is also reduced.

Figure 4:
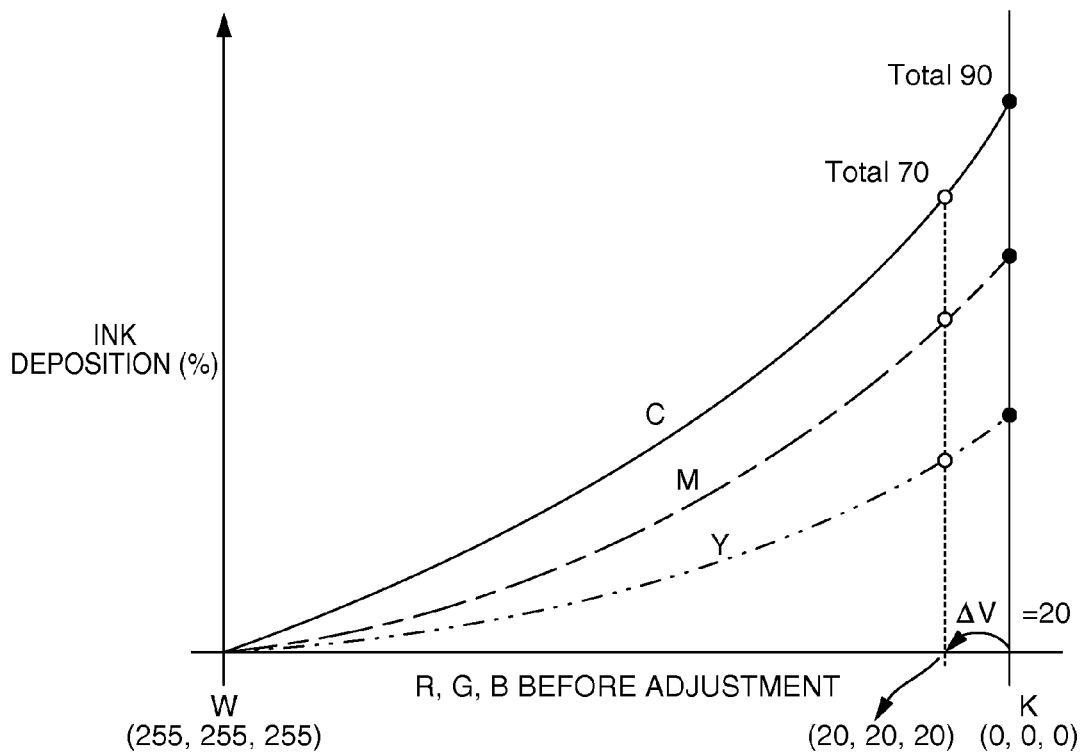
FIG. 4 is a graph describing the correlation between the gray level before density adjustment and the corresponding amount of ink of each color in achromatic RGB image data.

FIG. 4 is a graph showing the correlation between the gray level of the achromatic RGB image data before adjustment and the corresponding amount of cyan (C), magenta (M), and yellow (Y) ink that is required for printing. The color conversion table CT stored in the hard disk drive 33 of the host computer 3 in this embodiment of the invention stores the correlation shown in FIG. 4 as specific numeric values.

The ink deposition values shown in the figure are expressed as a percentage of coverage (%) per unit area.

As shown in FIG. 4, the amount of each color of ink that is discharged increases as the gray level changes from white (W) to black (K). For example, when the density is not adjusted, cyan (C), magenta (M), and yellow (Y) are mixed and deposited to a total area coverage of 90% in order to print black (R, G, B)=(0,0, 0). However, if the density is adjusted ΔV to print black (K) as (R, G, B)=(20, 20, 20), ink deposition can be reduced to a total 70%. In other words, adjusting the density reduces the amount of cyan (C), magenta (M), and yellow (Y) ink that must be deposited, and can therefore reduce total ink consumption.

Figure 5:
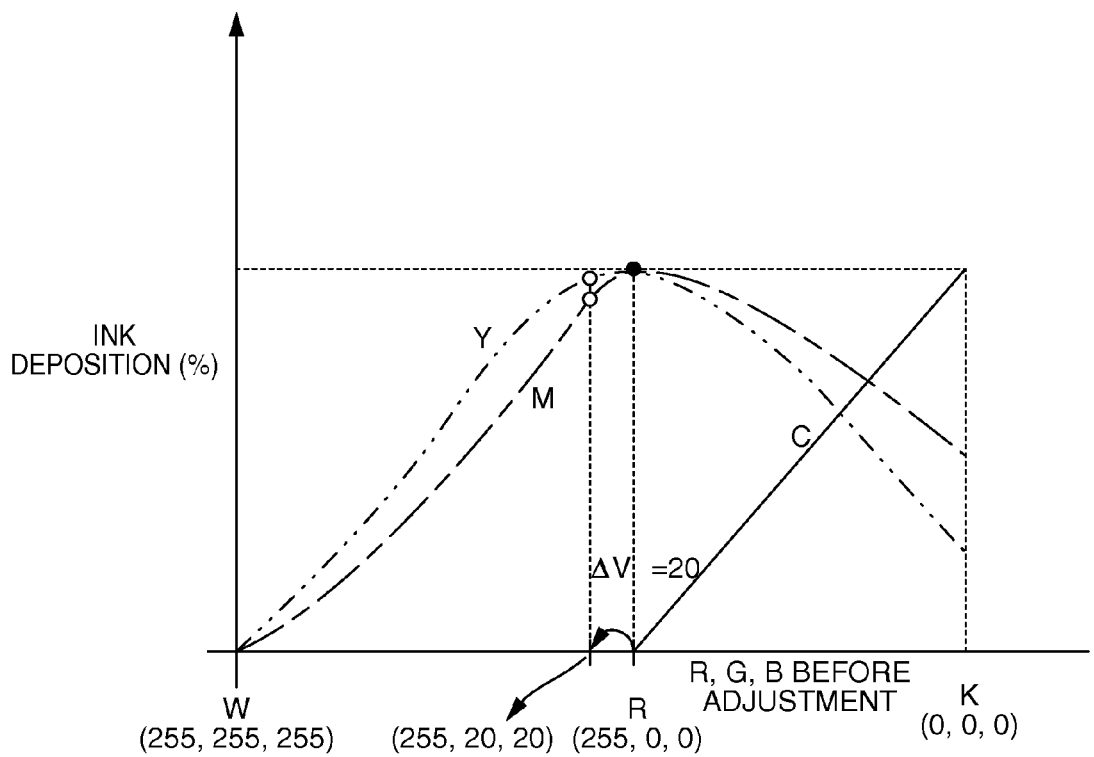
FIG. 5 is a graph describing the correlation between the gray level before density adjustment from achromatic white (W) in RGB image data to chromatic red (R), and then to achromatic black (K), and the corresponding amount of ink of each color.

FIG. 5 is a graph showing the correlation between the gray level before density adjustment from achromatic white (W) in RGB image data to chromatic red (R), and then to achromatic black (K), and the corresponding consumption of cyan (C), magenta (M), and yellow (Y) inks. The color conversion table CT stored on the hard disk drive 33 of the host computer 3 in this embodiment of the invention stores the correlation shown in FIG. 5 as specific numeric values.

As shown in FIG. 5, deposition of magenta (M) and yellow (Y) inks increases as the gray level changes from white (W) to red (R), and is greatest when printing red (R,G,B)=(255,0, 0). As the gray level continues to change to black (K), the amount of cyan (C) increases until cyan (C) deposition is maximized at black (R,G,B)=(0,0, 0). Deposition of magenta (M) and yellow (Y), however, decreases as the gray level approaches black (K). If the density is adjusted by ΔV to print red (R) as (R,G,B)=(255, 20, 20), however, deposition (consumption) of magenta (M) and yellow (Y) can be decreased.

The adjustment value ΔV used in the density adjustment process for adjusting the density of each channel of each pixel is set by the density adjustment parameter setting unit 250. The density adjustment parameter setting unit 250 in this embodiment of the invention sets the adjustment value according to the input ink deposition level (usage setting).

Figures 6, 7:
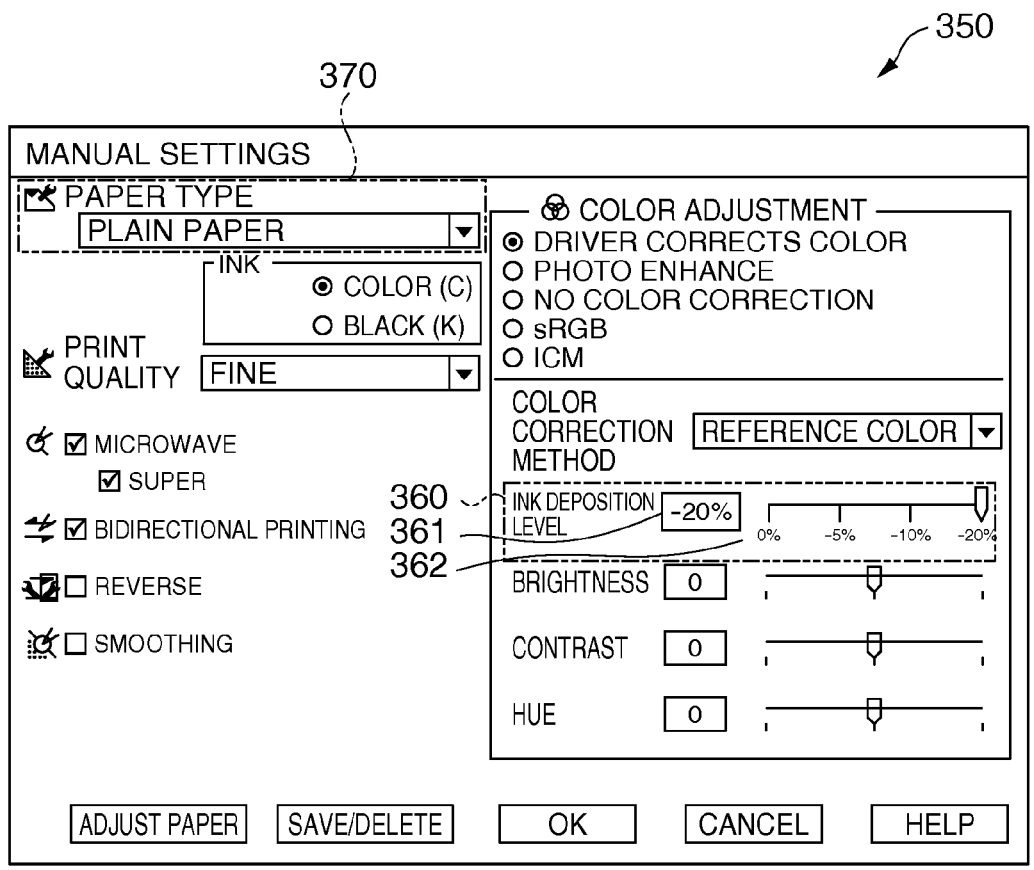
FIG. 6 shows an example of a print settings configuration screen.
FIG. 7 shows an example of an adjustment determination table.

An example of the print settings configuration screen is shown in FIG. 6. As shown in FIG. 6, the ink deposition level can be set from a print settings configuration screen (input window) that is displayed on the display 39 through the display interface 35. The print settings configuration screen 350 includes an ink deposition level configuration area 360 for setting the ink deposition level (how much recording material (ink) is used), and a paper type configuration area 370. When the user enters a value into the input box 361 of the ink deposition level configuration area 360 using the mouse 37 and keyboard 38, the density adjustment parameter setting unit 250 sets the adjustment value ΔV according to the input ink deposition level.

The ink deposition level configuration area 360 also has a slider 362 that moves to a position corresponding to the value entered in the input box 361, and the user can alternatively set the ink deposition level and adjustment value ΔV by moving the slider 362 to the desired position.

The paper type configuration area 370 enables selecting the type of paper used from among a plurality of paper types, including plain paper, bond paper, and synthetic paper.

FIG. 7 shows an example of the adjustment value ΔV determination table. The adjustment value ΔV that is set according to the input ink deposition level is determined by referencing an adjustment value determination table stored in the hard disk drive 33. As shown in FIG. 7, the adjustment value determination table VT correlates the adjustment value ΔV to specific ink deposition levels of 0%, −5%, −10%, and −20%. In this embodiment of the invention the ink deposition level is set to 0% when the density is not adjusted, and the table thus shows the decrease in ink consumption from the ink deposition level when the density adjustment is 0%. As the ink deposition level decreases, the adjustment value ΔV therefore increases, ink deposition decreases, and density decreases.

The adjustment value ΔV is set with reference to the paper type set in the paper type configuration area 370 of the print settings configuration screen 350 in addition to the ink deposition level. Referring to the adjustment value determination table VT in FIG. 7, when the paper type is set to "plain paper," the adjustment value ΔV=5 if the ink deposition level is −5%, and the adjustment value ΔV=20 if the ink deposition level is −20%. However, if the paper type is "bond paper," the adjustment value ΔV=7 if the ink deposition level is −5%, a higher value than when plain paper is selected and ink deposition is thus further decreased. This is because when the paper type is set to bond paper, the color conversion process produces CMY values requiring greater ink deposition than when printing to plain paper, thus using more ink for printing. It is therefore necessary to decrease ink deposition and further reduce the print density in order to reduce bleeding.

Similarly, if the paper type is set to synthetic paper, the adjustment value ΔV=11 if the ink deposition level is −5%, thus increasing the adjustment value ΔV compared with plain paper and thereby further reducing ink deposition.

Color Conversion Process

The color conversion unit 230 runs a process to convert the R'G'B' image data after density adjustment to data corresponding to the amount of each color of ink used by the inkjet printer 2 to print. Because the inkjet printer 2 prints using three colors of ink, cyan (C), magenta (M), and yellow (Y), in this embodiment of the invention, the color conversion unit 230 converts the gray level values of the R'G'B' image data to CMY image data (second image data), which is CMY bitmap data.

The color conversion unit 230 uses the color conversion table CT stored in the hard disk drive 33 for the color conversion process. The color conversion table CT correlates colors defined by the red (R), green (G), and blue (B) gray level values to the deposition of cyan (C), magenta (M), and yellow (Y) inks. The RGB values for black and gray in particular are correlated to the deposition of cyan (C), magenta (M), and yellow (Y) inks to achieve the desired black or gray color by combining cyan (C), magenta (M), and yellow (Y). More specifically, the black R'G'B' values are converted to CMY values that balance ink deposition to achieve the desired composite black, and the gray R'G'B' values are converted to CMY values that balance ink deposition to achieve the desired gray.

Halftone Process

The halftone processing unit 240 applies a halftone process to the CMY image data to generate output data indicating whether or not the inkjet printer 2 prints a particular dot during printing. The printer driver 200 then outputs this output data through the output interface 36 to the inkjet printer 2 to control printing by the inkjet printer 2.

As described above, the printer driver 200 sequentially applies a drawing process, density adjustment process, color conversion process, and halftone process to the print data received from the application 100 to generate output data for printing after adjusting the density of each channel. The process executed by the printer driver 200 is described in detail below with reference to the flow chart in FIG. 8. Before the process shown in FIG. 8 starts the ink deposition level is input to the ink deposition level configuration area 360 in the print settings configuration screen 350, and the parameter setting for the adjustment value $\Delta V$ corresponding to the input value is stored at a known address in RAM 32.

Figure 8:
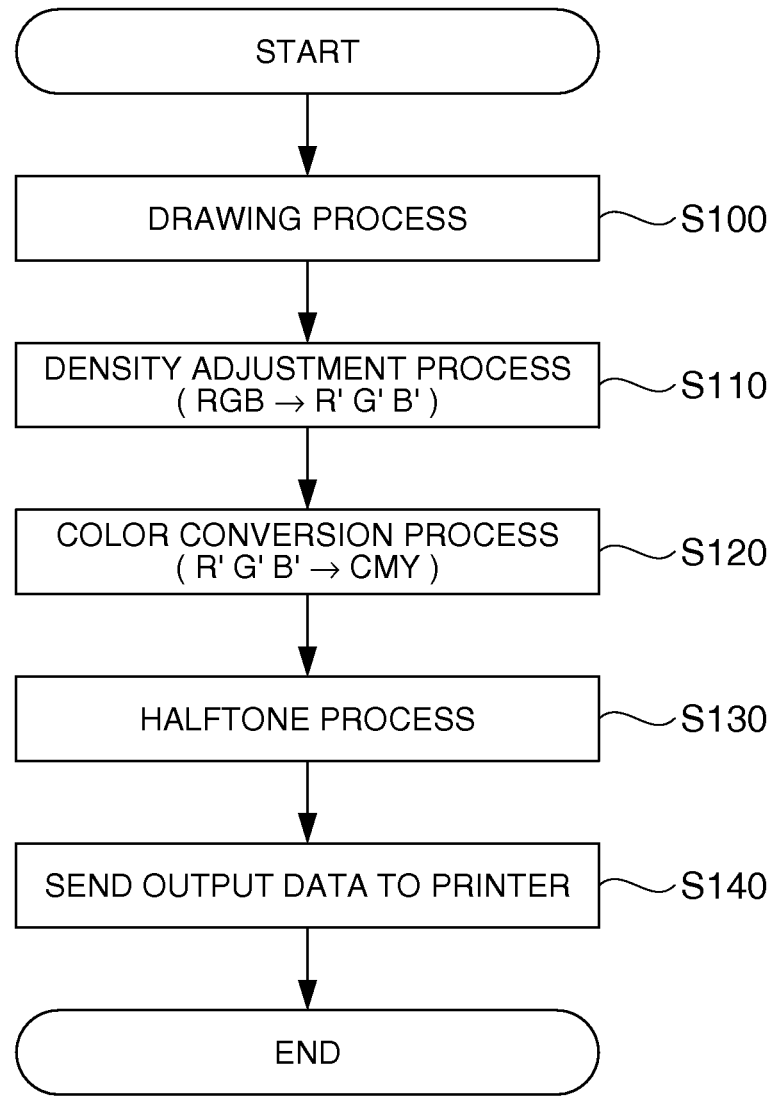
FIG. 8 is a flow chart of the printing process.

When the application 100 generates print data for printing a barcode and the printer driver 200 receives the print data from the application 100, for example, the process shown in FIG. 8 starts and the CPU 30 applies the drawing process to the print data from the application 100 (step S100). Of the data descriptions contained in the print data, text strings for which a barcode font is specified are interpreted and barcode image data is written to a particular storage area in RAM 32. If text, graphics, and images set to a human-readable font is included in the received print data, the print data is interpreted and written to a particular storage area in RAM 32 by means of the normal drawing process. This step S100 results in RGB image data being stored in RAM 32.

The CPU 30 then runs the process for adjusting the density of each channel of each pixel in the RGB image data (step S110). This density adjustment process first reads the parameter values set according to the input values input from the print settings configuration screen 350 from RAM 32 to get the adjustment value $\Delta V$. The operations shown by the equations (predetermined functions) (1) to (3) below are then applied to the gray level value (R,G,B) of each color in the RGB image data to convert the RGB image data to R'G'B' image data.

$$R'=R\times\{(255-\Delta V)/255\}+\Delta V \quad (1)$$

$$G'=G\times\{(255-\Delta V)/255\}+\Delta V \quad (2)$$

$$B'=B\times\{(255-\Delta V)/255\}+\Delta V \quad (3)$$

For example, if the user selects "plain paper" in the paper type configuration area 370 of the print settings configuration screen 350, and sets −20% as the ink deposition level in the ink deposition level configuration area 360, the density adjustment parameter setting unit 250 accesses the adjustment value determination table VT in FIG. 7 and sets the adjustment value $\Delta V$ to 20. The density adjustment unit 220 then converts the RGB image data to R'G'B' image data based on the above equations (1), (2), and (3). As shown by curve L' in FIG. 3, for example, the black gray level values (R,G,B)= (0,0,0) are converted to (R',G',B')=(20,20,20), the red gray level values (R,G,B)=(255,0,0) are converted to (R',G',B')= (255,20,20), and orange gray level values (R,G,B)=(255,70, 5) are converted to (R',G',B')=(255,84,24).

The CPU 30 then reads the color conversion table CT stored in the hard disk drive 33 to convert the R'G'B' image data after density adjustment to CMY image data (step S120). The color conversion table CT correlates each color in the RGB color space to CMY values producing the same color. Because the RGB values for black are also correlated to the CMY values producing composite black, the black R'G'B' values are converted to CMY values for composite black.

The color conversion process references the color conversion table CT corresponding to the paper type input to the paper type configuration area 370 of the print settings configuration screen 350. For example, if the paper type is set to bond paper, the color conversion process references the color conversion table CT for bond paper and thus produces print data that uses more ink than when the paper type is set to plain paper. This improves the legibility of text and other content printed on bond paper. Likewise, if the paper type is set to synthetic paper, which is more resistant to ink bleed than plain paper, the color conversion process references the color conversion table CT for synthetic paper and produces print data that uses even more ink than if the paper type is set to bond paper. This enables printing rich colors with desirable print quality on synthetic paper. In addition, regardless of which color conversion table CT is used, the color conversion process produces CMY image data that achieves the desired composite black color.

The CPU 30 then applies the halftone process to the CYM image data to generate output defining whether a particular dot prints or not (step S130), and outputs the output data through the output interface 36 to the inkjet printer 2 (step S140).

The inkjet printer 2 then discharges ink droplets according to the output data from the host computer 3 to form dots on the surface of the paper or other print medium and print the barcode and other objects described by the print data.

Step S100 is the process executed by the CPU 30 functioning as the drawing unit 210, step S110 is the process executed by the CPU 30 functioning as the density adjustment unit 220, step S120 is the process executed by the CPU 30 functioning as the color conversion unit 230, and step S130 is the process executed by the CPU 30 functioning as the halftone processing unit 240.

The effect of this first embodiment of the invention is described next.

(1) Because CMY image data is generated by applying a color conversion process to R'G'B' image data after density adjustment, the balance between the amount of cyan (C), magenta (M), and yellow (Y) ink resulting from the color conversion process is not disturbed by the density adjustment process. More particularly, the density of composite black can be adjusted to a desirable density without the density adjustment process changing the balance between the amount of cyan (C), magenta (M), and yellow (Y) ink used to produce composite black. Therefore, an inkjet printer 2 that does not use black (K) ink can print a suitably dense black with minimal color shift. Color shifting caused by the density adjustment process can also be prevented in grays that are produced by combining cyan (C), magenta (M), and yellow (Y) inks because the density adjustment process does not change the balance between the amount of each ink used.

(2) The desired adjustment value $\Delta V$ is set by the user simply entering the ink deposition level as shown in FIG. 3. The density adjustment process ultimately reduces the overall density of the printed image by increasing the gray level by the adjustment value $\Delta V$. The amount of cyan (C), magenta (M), and yellow (Y) ink consumed to express all colors, and not just composite black, can therefore be reduced and ink can be saved.

(3) Because reducing ink deposition as described above reduces the density of composite black and reduces the amount of ink used to print a barcode, bleeding can be reduced in barcodes printed on the print medium. When the barcode is read by a barcode reader (not shown in the figure), bleeding does not make the line width of the bars in the barcode to be read wider than intended, and high quality barcodes that are resistant to read errors can be printed. If the adjustment value $\Delta V$ is set to a predetermined value (>0), the adjustment value $\Delta V$ can be adjusted to a smaller value to increase density by increasing the ink deposition level set in the print settings configuration screen 350. Insufficient density in the bars of the barcode can therefore be eliminated, and high quality barcodes that are resistant to read errors by the barcode reader caused by insufficient density can be printed. More specifically, high quality barcodes with appropriate density can be printed.

(4) Color shift can be prevented in achromatic colors such as black and gray as well as in chromatic colors, and printed materials printed with desirable color density can be achieved by the user simply inputting the ink deposition level in the ink deposition level configuration area 360 of the print settings configuration screen 350 using the mouse 37 or keyboard 38.

Embodiment 2

A second embodiment of the invention is described next. In the first embodiment of the invention the adjustment value $\Delta V$ that adjusts the density is set by inputting the ink deposition level in the input box 361 of the print settings configuration screen 350 to adjust ink deposition by the inkjet printer 2.

In this second embodiment of the invention, however, the adjustment value $\Delta V$ is input directly as the density adjustment value (ink usage setting) in the input box 310 of the print settings configuration screen 300 to adjust the print density of the inkjet printer 2.

Note that like parts are identified by the same reference numerals in the first embodiment and this second embodiment, and further detailed description thereof is omitted.

Figure 9:
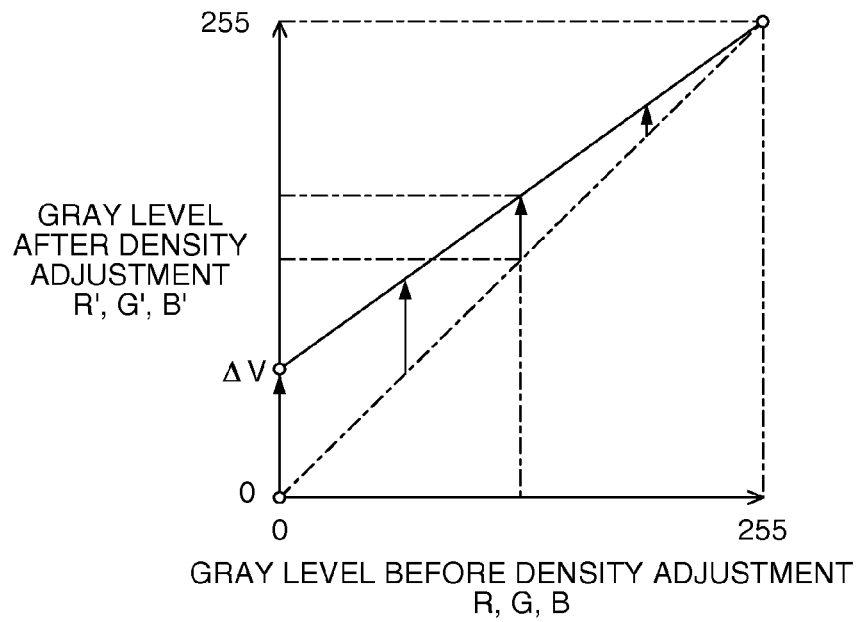
FIG. 9 describes the density adjustment process in a second embodiment of the invention.

As in the first embodiment described above, the density adjustment unit 220 in this second embodiment executes a density adjustment process to adjust the print density of each color. FIG. 9 is a graph showing the gray level before and after the density adjustment process, The gradation level (R,G,B) before density adjustment of the (R,G,B) image data is shown on the horizontal axis (x-axis), and the gradation level (R', G', B') after density adjustment is shown on the vertical axis (y-axis).

As shown in FIG. 9, the density adjustment process applies adjustment value $\Delta V$ ($\geq 0$) to the gradation values of black (R,G,B)=(0,0,0) before adjustment, and outputs the converted levels (R',G',B')=($\Delta V, \Delta V, \Delta V$). The gray values of white (R,G,B)=(255,255,255) are not adjusted, and white is output as (R',G',B')=(255,255,255). A linear conversion is applied to gray levels with a lower density than black (0<R, G,B<255) so that there is a smooth, continuous transition in the adjusted gray levels from black to white after adjusting the gray levels from (R',G',B')=($\Delta V, \Delta V, \Delta V$) to (R',G',B')=(255, 255,255). By thus adjusting the gray levels of red (R), green (G), and blue (B) the same amount, the density adjustment process keeps achromatic colors in the (R,G,B) image data achromatic while adjusting the density of black and gray to generate the R'G'B' image data.

Figure 10:
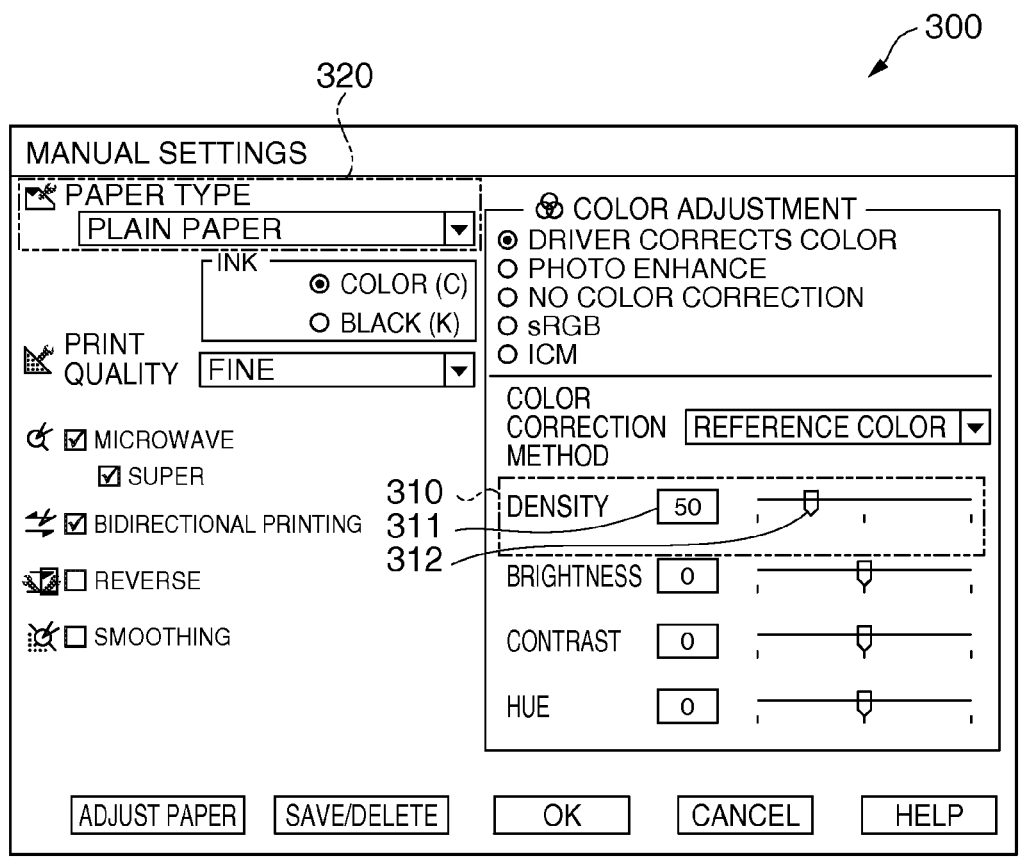
FIG. 10 shows an example of another print settings configuration screen.

The print density adjustment value is set in the print settings configuration screen (input menu) displayed by the density adjustment parameter setting unit 250 on the display 39 through the display interface 35. As shown in FIG. 10, the print settings configuration screen 300 has a density adjustment setting input area 310 and paper type configuration area 320. When the user enters a value in the input box 311 of the density adjustment setting input area 310 using the mouse 37 or keyboard 38, the input value is set as the adjustment value $\Delta V$ by the density adjustment parameter setting unit 250.

The density adjustment setting input area 310 also includes a slider 312 that moves to a position corresponding to the value entered in the input box 311, and the user can alternatively set the density adjustment value V by moving the slider 312 to the desired position.

The paper type configuration area 320 enables selecting the type of paper used from among a plurality of paper types, including plain paper, plain paper labels, and bond paper.

The effect of this second embodiment of the invention is described next.

(5) Because the adjustment value $\Delta V$ is set automatically as a result of the user directly inputting the density adjustment value into a print settings configuration screen displayed on the display 39, the user can adjust the density as desired while keeping the hue the same.

Embodiment 3

A third embodiment of the invention is described next. In the second embodiment the user adjusts the print density of the inkjet printer 2 by directly entering the density adjustment value into the input area 310 of the print settings configuration screen 300. The adjustment value $\Delta V$ is set in this third embodiment, however, by selecting the desired level from among a plurality of selectable density adjustment levels.

Note that like parts are identified by the same reference numerals in the first embodiment and this third embodiment, and further detailed description thereof is omitted.

Figure 11:
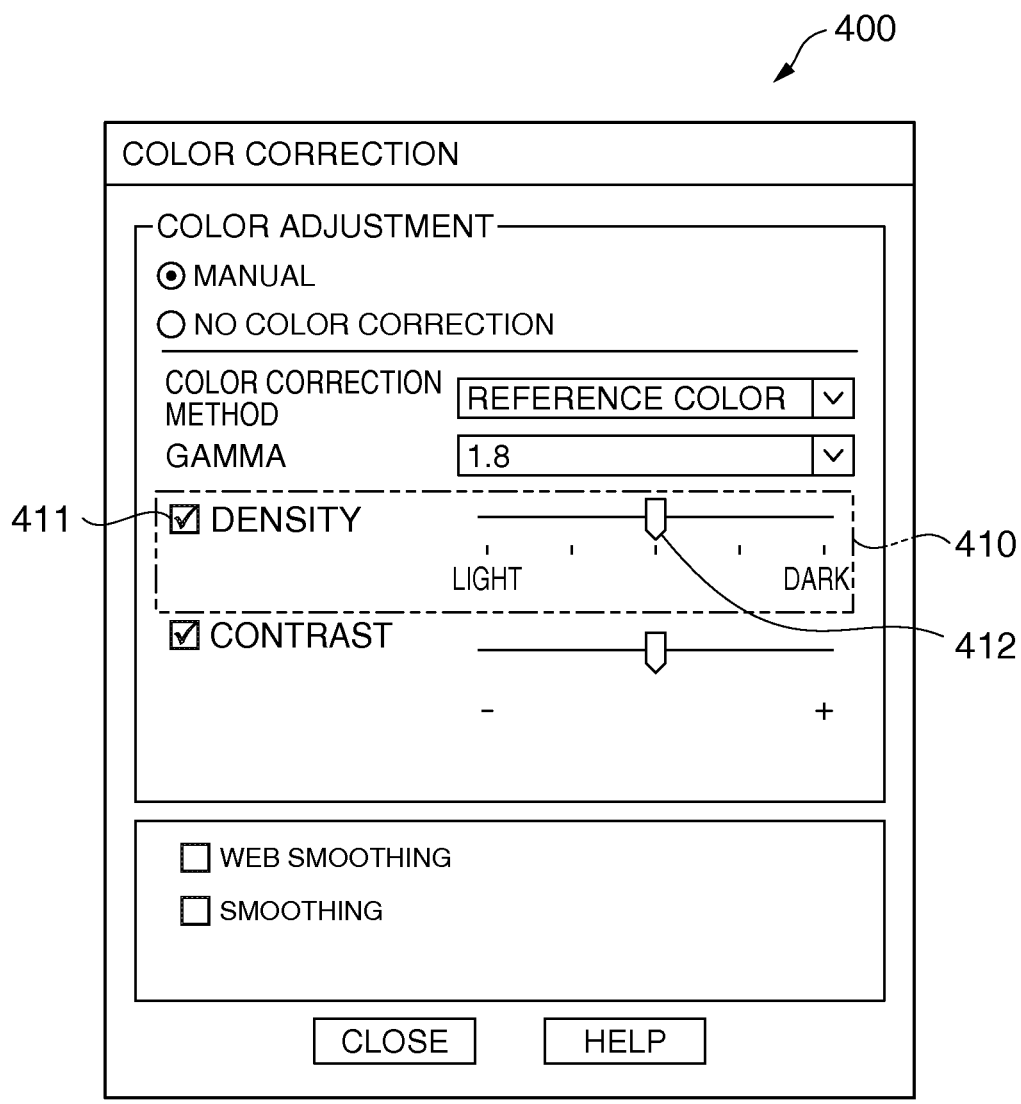
FIG. 11 shows an example of a color adjustment screen in a third embodiment of the invention.

In this third embodiment of the invention the density adjustment level (degree of adjustment) is set according to a color adjustment screen displayed on the display 39 by asserting a specific command to the printer driver 200. As shown in FIG. 11, for example, the density adjustment setting area 410 of the color adjustment window 400 includes a check box 411 for enabling and disabling density adjustment, and a slider 412 that can move to a position corresponding to one of five density adjustment levels 1 to 5. In this embodiment density adjustment level 1 is the lowest density and level 5 is the highest density. The user uses the mouse 37 or keyboard 38 to adjust the position of the slider 412 in the density adjustment setting area 410 and thereby select the desired level (usage setting) from among the five density adjustment levels.

Figures 12, 13:
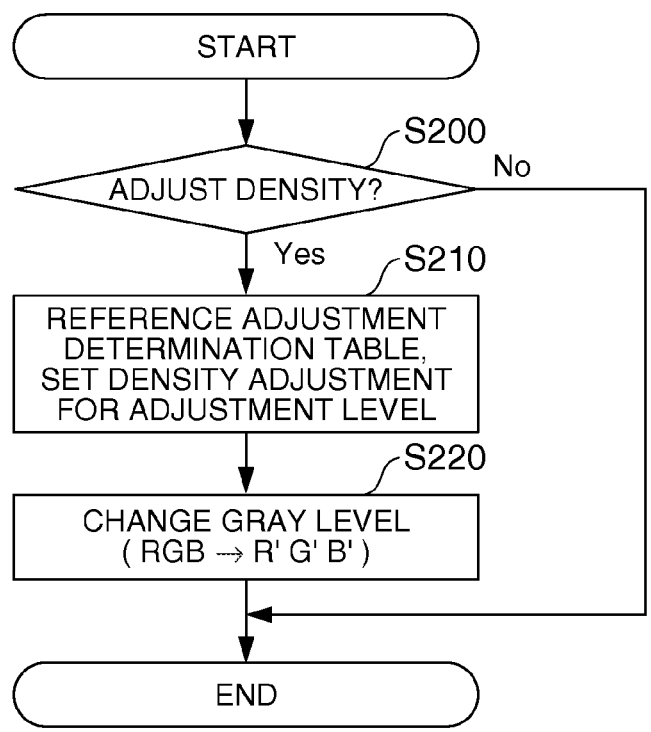
FIG. 12 shows another example of a density adjustment determination table.
FIG. 13 is a flow chart of the density adjustment process.

The adjustment value $\Delta V$ corresponding to the selected density adjustment level is determined by referencing a density adjustment value determination table stored in the hard disk drive 33. An example of the density adjustment value determination table KT is shown in FIG. 12. As shown in FIG. 12, the density adjustment value determination table KT correlates the adjustment value ΔV to density adjustment levels 1 to 5, and as the density adjustment level rises, the adjustment value ΔV, which reduces density, becomes smaller.

The adjustment value ΔV is set with reference to the paper type set in the paper type configuration area 320 of the print settings configuration screen 300 in addition to the density adjustment level. Referring to the density adjustment value determination table KT in FIG. 12, when the paper type is set to "plain paper" and the density adjustment level is level 1, the adjustment value ΔV=20, and the adjustment value ΔV=0 if the density adjustment level is level 5. However, if the paper type is "plain paper label" and the density adjustment level is level 1, the adjustment value ΔV=30, a higher adjustment value ΔV than when plain paper is selected and print density is thus further decreased. This is because when the paper type is set to plain paper labels, the color conversion process produces higher density CMY values than when printing to plain paper, thus using more ink for printing and making it necessary to further reduce the print density in order to reduce bleeding.

The process executed in this third embodiment of the invention is substantially the same as the process shown in the flow chart in FIG. 8, but the content of the density adjustment process differs from that of the first embodiment. The density adjustment process in this third embodiment of the invention is described below with reference to the flow chart in FIG. 13.

When the density adjustment process starts the CPU 30 determines if density adjustment is enabled or not based on whether the check box 411 in the density adjustment setting area 410 of the color adjustment window 400 is checked (step S200). If the check box 411 is checked, the density adjustment process is enabled (step S200 returns Yes) and control goes to step S210. If the check box 411 is not checked, the density adjustment process is not enabled (step S200 returns No), and the density adjustment process ends. Because there is no conversion to R'G'B' image data by the density adjustment process in this case, the RGB image data is converted to CMY image data in the color conversion process executed in step S120.

If control proceeds to step S210, the CPU 30 reads the parameter setting for the adjustment level set in the color adjustment window 400 from a predetermined storage area in RAM 32, references the density adjustment value determination table KT stored in the hard disk drive 33, and sets the adjustment value ΔV corresponding to the set adjustment level.

The CPU 30 then generates the R'G'B' image data by converting the gray level using the selected adjustment value ΔV according to the equations (1) to (3) described above in the first embodiment (step S220). The density adjustment process ends when step S220 is completed.

Steps S200 and S210 are executed by the CPU 30 functioning as the density adjustment parameter setting unit 250, and step S220 is executed by the CPU 30 functioning as the density adjustment unit 220.

The effect of this third embodiment of the invention is described next.

(6) The density adjustment value can be set by moving the position of the slider 412 in the color adjustment window 400 to select the desired level from among five adjustment levels corresponding to the degree of density adjustment to apply. Because the degree of density adjustment can be selected, controlling density adjustment is easier for the user. For example, even users that are not familiar with the density adjustment operation and therefore have difficulty setting the adjustment value ΔV appropriately can easily set the adjustment value ΔV to the appropriate level by selecting the desired degree of adjustment from among five adjustment levels.

(7) Because the density adjustment process sets the optimal adjustment value ΔV for the paper type selected in the print settings configuration screen 300, the print density can be set appropriately to the paper type and ink bleeding can be desirably suppressed.

The invention is described with reference to three preferred embodiments above, but the invention is not so limited and can be varied as described below, for example.

Variation 1

In the third embodiment the adjustment value ΔV is optimized for the paper type to prevent ink bleeding due to differences in paper type, but the adjustment value ΔV may alternatively be set according to the print resolution to achieve the desired print quality when ink bleed and the conspicuousness of ink bleed is also affected by the print resolution. More specifically, the optimal adjustment value ΔV for each print resolution setting may also be set for each adjustment level in the density adjustment value determination table KT, and the process that sets the adjustment value ΔV in step S210 may reference this density adjustment value determination table KT to set the adjustment value ΔV according to the print resolution.

Variation 2

Figure 14:
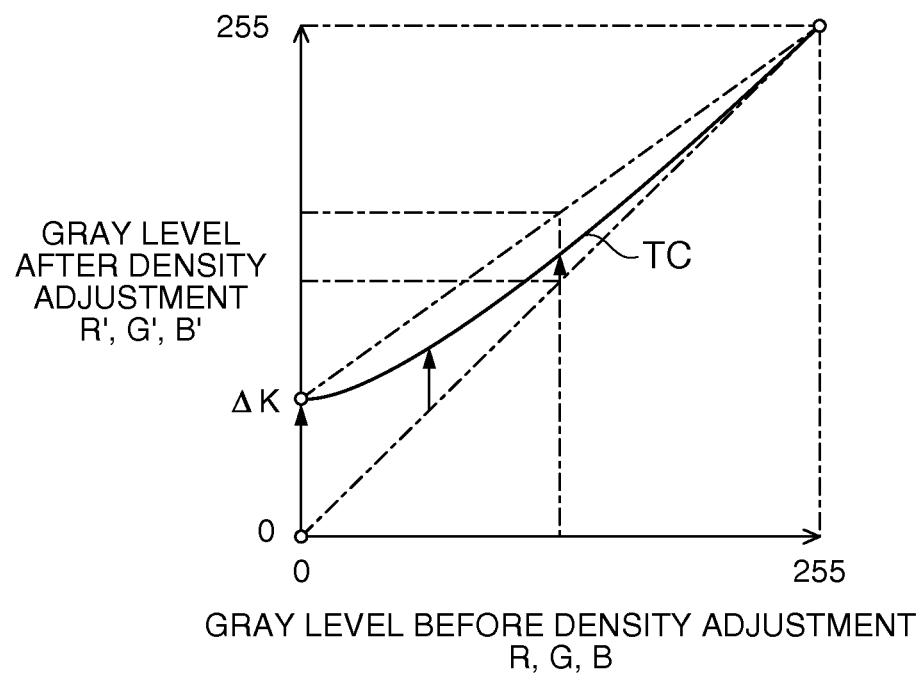
FIG. 14 describes a second variation of the invention.

The first and third embodiments use a density adjustment process that uses a linear gradation conversion as shown in equation (1), but the adjustment method of the density adjustment process is not so limited. For example, when the black density is adjusted by adjustment value ΔV, the gradation conversion of the density adjustment process may follow a gradation conversion curve TC (see FIG. 14) that is downwardly concave from the straight line connecting the black gradation level and the white gradation level in order to reduce the density change in gray resulting from the density adjustment process. This reduces the change in the density of gray while adjusting the density of black, and enables using black to adjust the density of colors in which there is a density change.

Variation 3

In the first to third embodiments described above the drawing unit 210 outputs RGB image data. However, if monochrome printing is used or the print data contains only a barcode, the drawing unit 210 generates gray scale image data (first image data) for the density of black K, and applies the density adjustment process and other processes to the resulting gray scale image data.

Variation 4

In the first to third embodiments described above composite black is produced using the three ink colors cyan, magenta, and yellow, but the colors in the ink set are not so limited. For example, light magenta (LM) that is lighter than magenta (M), light cyan (LC) that is lighter than cyan (C), and light yellow (LY) that is lighter than yellow (Y) may be used in addition to cyan (C), magenta (M), and yellow (Y), or red (R), green (G), and blue (B) inks may additionally be used to produce composite black using four or more different colors of ink.

Variation 5

An inkjet printer is described in the first to third embodiments described above, but the printer of the invention is not so limited. More particularly, the invention may be applied to any type of printer that prints composite black, including dot impact printers, thermal transfer printers, and laser printers.

Variation 6

In the first to third embodiments described above the host computer 3 executes the drawing process, density adjustment process, color conversion process, and halftone process, but the host computer 3 could execute the drawing process, density adjustment process, and color conversion process and output the data resulting from the color conversion process as the output data to the printer. In this case the printer applies the halftone process to the received output data, and prints based on the result of the halftone process.

Further alternatively, the printer described as the image processing device of the invention may apply the drawing process, density adjustment process, color conversion process, and halftone process to print data received from the host computer.

Further alternatively, the host computer may apply the drawing process and output the RGB image data resulting from the drawing process as the output data to the printer. In this case, the printer used as the image processing device applies the density adjustment process, color conversion process, and halftone process to the print data received from the host computer.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An image processing device configured to output data to a printer for printing using a plurality of different primary recording materials, the image processing device comprising:
   an acquisition unit that acquires first image data representing the density of each color in each pixel of an image to be printed;
   a display that displays an input screen for a user to input a usage setting with respect to the different primary recording materials and to input a type of print medium, selected from a plurality of media types, on which to print;
   a setting unit that receives the usage setting and sets an adjustment value corresponding to the usage setting and the type of print medium selected;
   an adjustment unit that adjusts the density of the first image data based on the adjustment value;
   a conversion unit that converts the density-adjusted first image data representing achromatic color to second image data representing usage of each of the primary recording materials, wherein the plurality of different primary recording materials are combined to achieve achromatic color of the second image data; and
   a generating unit that generates output data based on the second image data;
   wherein the first image data represents a barcode image.

2. The image processing device described in claim 1, wherein the adjustment unit adjusts the density of the first image data by applying a shifting function.

3. The image processing device described in claim 1, wherein the usage setting is a level of usage of each of the different primary recording materials.

4. The image processing device described in claim 1, wherein the usage setting is a density adjustment level for the different primary recording materials.

5. An image processing method that generates output data for printing using a plurality of primary recording materials, comprising the steps of:
   acquiring first image data representing the density of each color in each pixel of an image to be printed;
   inputting, by a user, on a display screen, a usage setting with respect to the primary recording materials and a type of print medium, selected from a plurality of media types, on which to print;
   setting an adjustment value corresponding to the usage setting that and the type of print medium selected;
   adjusting the density of the first image data on the adjustment value;
   converting the density-adjusted first image data representing achromatic color to second image data representing usage of each of the plurality of primary recording materials, wherein the plurality of different primary recording materials are combined to achieve achromatic color of the second image data; and
   generating the output data based on the second image data;
   wherein the first image data represents a barcode image.

6. A non-transitory device-readable medium containing an image processing program that, when executed, causes a device to generate output data for printing using a plurality of primary recording materials, the image processing program comprising:
   instructions for acquiring first image data representing the density of each color in each pixel of an image to be printed;
   instructions for displaying an input screen for a user to input a usage setting with respect to the primary recording materials and a type of print medium, selected from a plurality of media types, on which to print;
   instructions for setting an adjustment value corresponding to the usage setting and the type of print medium selected;
   instructions for adjusting the density of the first image data based on the adjustment value;
   instructions for converting the density-adjusted first image data representing achromatic color to second image data representing usage of each of the plurality of primary recording materials, wherein the plurality of different primary recording materials are combined to achieve achromatic color of the second image data; and
   instructions for generating the output data based on the second image data;
   wherein the first image data represents a barcode image.

* * * * *